(12) United States Patent
Liao et al.

(10) Patent No.: US 7,896,794 B2
(45) Date of Patent: Mar. 1, 2011

(54) HANGING MANUFACTURING APPARATUS FOR MANUFACTURING AIR ENCLOSURE

(75) Inventors: Chieh Hua Liao, Sindian (TW); Yaw Shin Liao, Sindian (TW); Yao Chuan Liao, Sindian (TW)

(73) Assignee: Chieh Hua Liao, Taipei County (TW)

( * ) Notice: Subject to any disclaimer, the term of this patent is extended or adjusted under 35 U.S.C. 154(b) by 0 days.

(21) Appl. No.: 12/182,831

(22) Filed: Jul. 30, 2008

(65) Prior Publication Data

US 2009/0082186 A1 Mar. 26, 2009

(30) Foreign Application Priority Data

Sep. 21, 2007 (TW) .............................. 96135464 A

(51) Int. Cl.
*B31B 1/64* (2006.01)
(52) U.S. Cl. ................. 493/203; 493/199; 493/205; 493/208; 493/209; 493/478; 493/479
(58) Field of Classification Search ................. 493/189, 493/199–203, 205, 208–209, 478–479
See application file for complete search history.

(56) References Cited

U.S. PATENT DOCUMENTS

| | | | | |
|---|---|---|---|---|
| 3,938,298 | A | * | 2/1976 | Luhman et al. ................ 53/403 |
| 4,430,069 | A | * | 2/1984 | Carlisle ....................... 493/203 |
| 4,680,024 | A | * | 7/1987 | Focke et al. .................. 493/197 |
| 5,021,039 | A | * | 6/1991 | Richter et al. ................. 493/14 |
| 5,045,042 | A | * | 9/1991 | Rutledge .................... 493/225 |
| 5,216,868 | A | * | 6/1993 | Cooper et al. .................. 53/79 |
| 5,529,659 | A | * | 6/1996 | Ellsworth et al. ........... 156/552 |
| 6,015,047 | A | * | 1/2000 | Greenland .................. 206/522 |
| 6,564,843 | B2 | * | 5/2003 | Johnson et al. ............. 156/359 |
| 6,629,917 | B2 | * | 10/2003 | Vanden Langenberg et al. .......................... 493/189 |

FOREIGN PATENT DOCUMENTS

| | | |
|---|---|---|
| JP | 2000-218718 A | 8/2000 |
| JP | 2000-218718 A | 8/2000 |
| TW | 587049 B | 5/2004 |
| TW | I224071 B | 11/2004 |
| WO | WO-2005118398 A1 | 12/2005 |

* cited by examiner

*Primary Examiner*—Christopher Harmon
(74) *Attorney, Agent, or Firm*—Rabin & Berdo, P.C.

(57) ABSTRACT

A first hanger and a second hanger are disposed on a working platform according to a hanging manufacturing apparatus for manufacturing an air enclosure, in which the first hanger is constituted by a first hanging frame and a plurality of first supporting arms and used for hanging a first hot sealing mold, the first hanging frame drives the first hot sealing mold on the plurality of first supporting arms to hot-seal an air cylinder film sheet while being moved to form a plurality of nodes on the air cylinder film sheet, and the second hanger is constituted by a second hanging frame and a plurality of second supporting arms and used for hanging a second hot sealing mold, the second hanging frame drives the second hot sealing mold on the plurality of second supporting arms to hot-seal the air cylinder film sheet while being moved to form a plurality of air cylinders on the air cylinder film sheet.

13 Claims, 8 Drawing Sheets

HANGING MANUFACTURING APPARATUS FOR MANUFACTURING AIR ENCLOSURE

CROSS-REFERENCES TO RELATED APPLICATIONS

This non-provisional application claims priority under 35 U.S.C. §119(a) on Patent Application No(s). 096135464 filed in Taiwan, R.O.C. on Sep. 21, 2007, the entire contents of which are hereby incorporated by reference.

FIELD OF THE INVENTION

The present invention relates to an apparatus for manufacturing an air enclosure, and more particularly to a hanging manufacturing apparatus for manufacturing an air enclosure.

BACKGROUND

Generally, when an article is packed, foams are always stuffed between the article and a paper box so as to use a soft material such as foam or Styrofoam to provide the article with the cushioning protection. However, foam and Styrofoam cause the environmental protection problem. At environmental consciousness rising today, Styrofoam is not a suitably ideal cushioning material. For solving the problem mentioned above, an air packing bag constituted by a plurality of air cylinders independent to each other is yielded thereby providing the cushioning protection to an article while being shaken.

Please refer to FIG. 1. A conventional apparatus for manufacturing an air packing bag includes a first hot sealing table A1 and a second hot sealing table A2 used for adhering one sheet of inner film A6 and one sheet of outer film A51 by means of hot sealing. After the hot healing is completed, a third hot sealing table A3 and a fourth hot sealing table A4 are then used to hot seal the one sheet of inner film a6, the one sheet of outer film A51 and one sheet of outer film 52, an air packing bag is manufactured after the hot sealing is completed, for example, an apparatus for manufacturing a check valve bag disclosed in Japanese Publication No. 2000-218718. However, many hot sealing tables must be assembled in the process of manufacturing to cause the whole manufacturing process to be rather complex and tedious. Moreover, the operation of a product line must be stopped and a large amount of time must be spent to extraordinarily add new hot sealing tables or replace with new hot sealing tables when a different air packing bag is manufactured; it not only is time and labor wasting but also causes production capacity to be damaged seriously because the production line must be stopped for a long time.

SUMMARY

For improving a structure of an apparatus for manufacturing an air packing bag, simplifying the production process of the air packing bag, elevating the efficiency of a hot sealing table replacement and avoid causing the production capacity to be damaged seriously because of the long time stoppage of the production line, the present invention is proposed.

The present invention proposes a hanging manufacturing apparatus for manufacturing an air enclosure, including:

a working platform, including a plurality of conveying rollers;

a first hanger, disposed on the working platform and including a first hanging frame and a plurality of first supporting arms, a disposition direction of the plurality of first supporting arms being the same as the conveying direction of an air cylinder film sheet, the first hanging frame driving a first hot sealing mold installed on the plurality of first supporting arms to hot-seal the air cylinder film sheet simultaneously while being moved; and a second hanger, disposed on the working platform and including a second hanging frame and a plurality of second supporting arms, the plurality of second supporting arms being disposed on the second hanging frame and used for hanging at least one second hot sealing molds, a disposition direction of the plurality of second supporting arms is perpendicular to a conveying direction of the air cylinder film sheet, the second hanging frame driving a second hot sealing mold installed on the plurality of second supporting arms to hot-seal the air cylinder film sheet simultaneously while being moved.

According to the present invention, the first hanging frame is used to drive the first hot sealing mold to hot-seal the air cylinder film to form a plurality of nodes, and the second hanging frame is used to drive the second hot sealing mold to hot seal the air cylinder film sheet to form a plurality of air cylinders to allow a process flow of the air cylinder film sheet to be more compact and smooth. In addition, the first supporting arm can be moved on the first hanging frame and the second supporting arm can be moved on the second hanging frame so as to adjust a distance between the first supporting arms and a distance between the second supporting arms, the different first hot sealing mold and the different second hot sealing mold may be hung depending the difference of the distance. Whereby, the replacement of the hot sealing mold is easy and the process can be carried out to the air cylinder film sheet with a different size.

BRIEF DESCRIPTION OF THE DRAWINGS

The present invention can be more fully understood by reference to the following description and accompanying drawings, in which.

DETAILED DESCRIPTION

Figure 1:
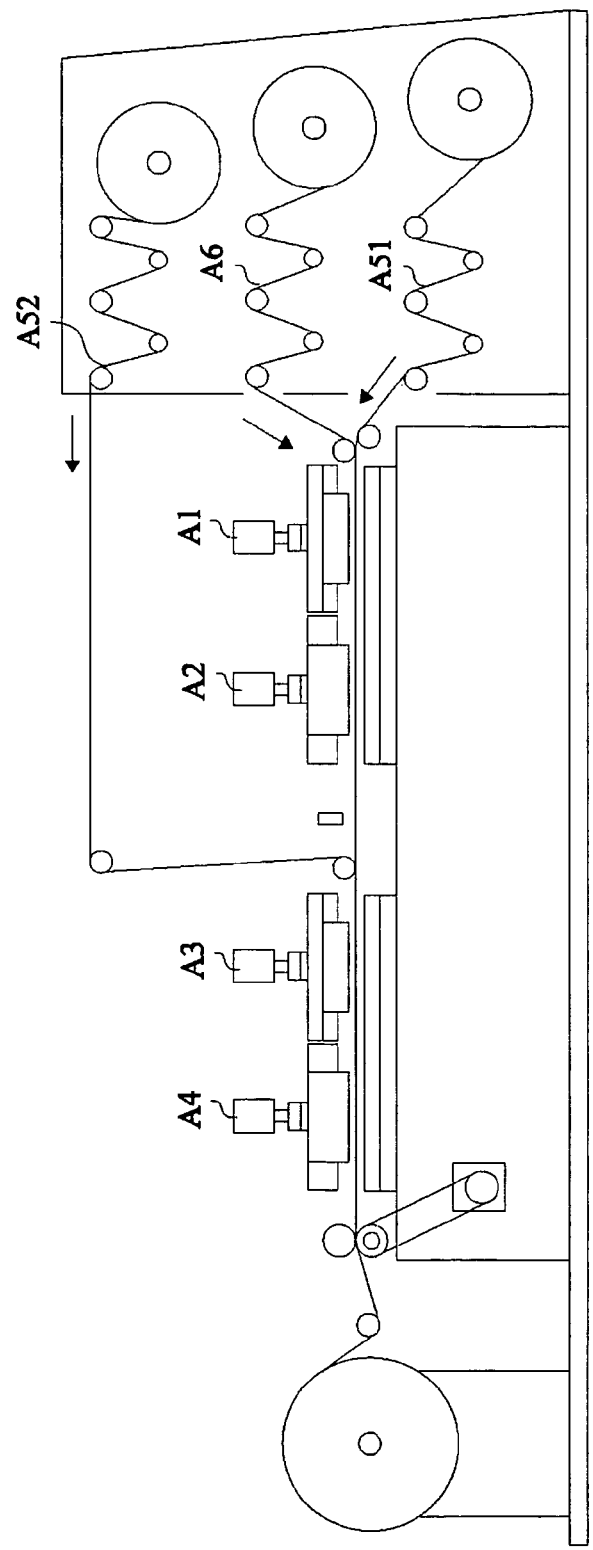
FIG. 1 is a schematic view of a conventional apparatus for manufacturing an air packing bag.
Figure 2:
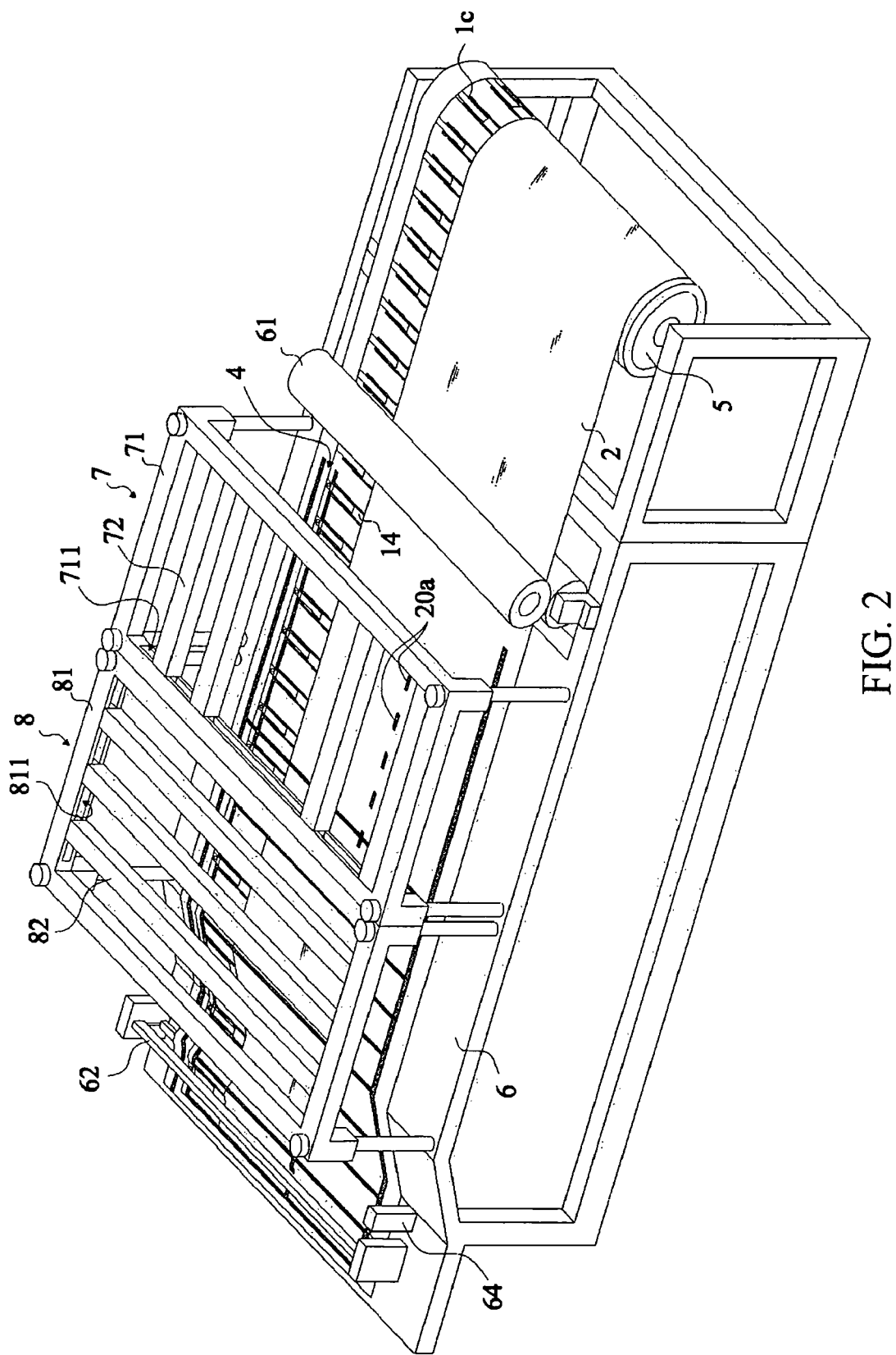
FIG. 2 is a perspective view, showing a hanging manufacturing apparatus for manufacturing an air enclosure of a first preferred embodiment according to the present invention.
Figure 3A:
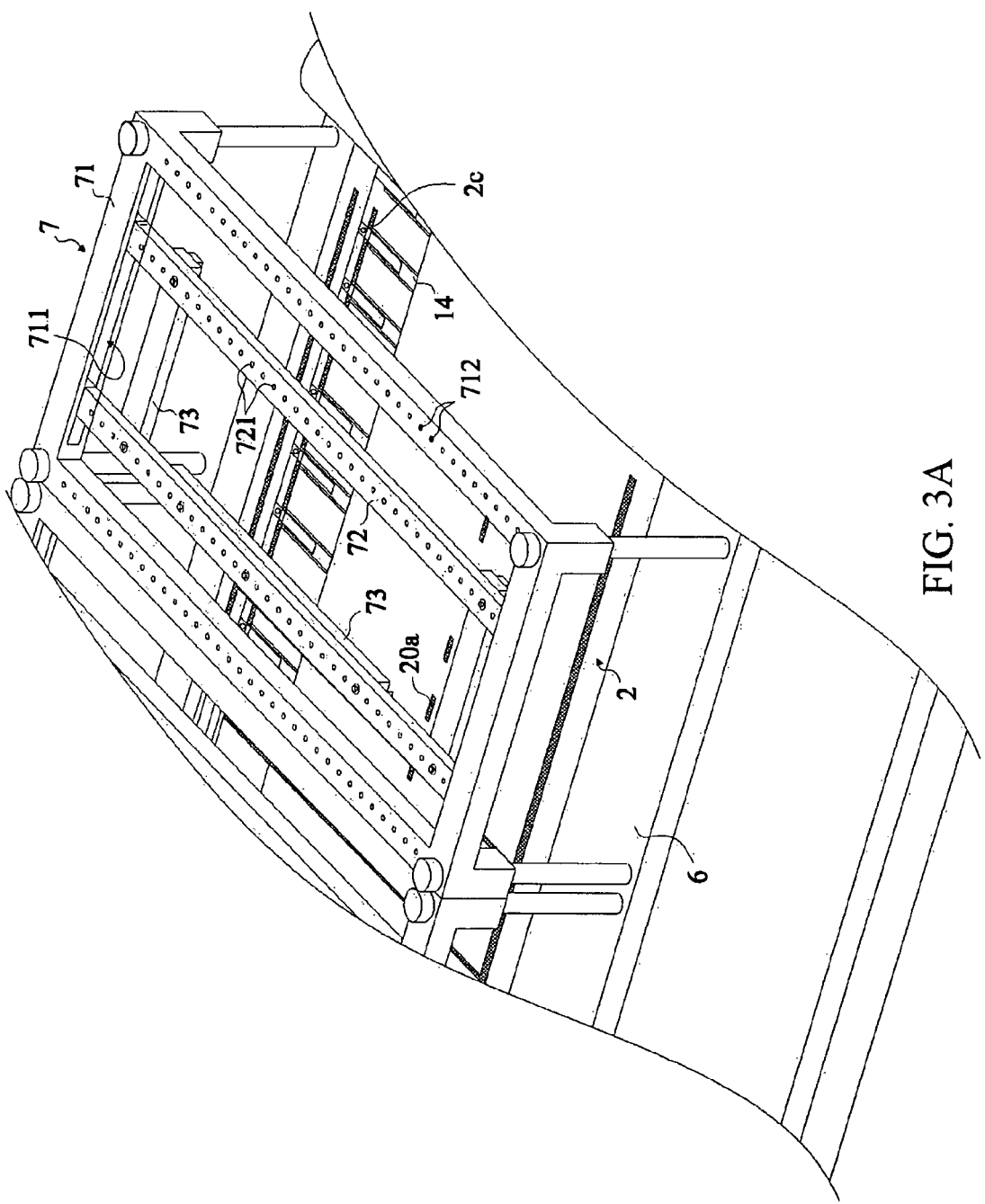
FIG. 3A is a partly perspective view, showing a first hanging frame of the first embodiment according to the present invention.
Figure 3B:
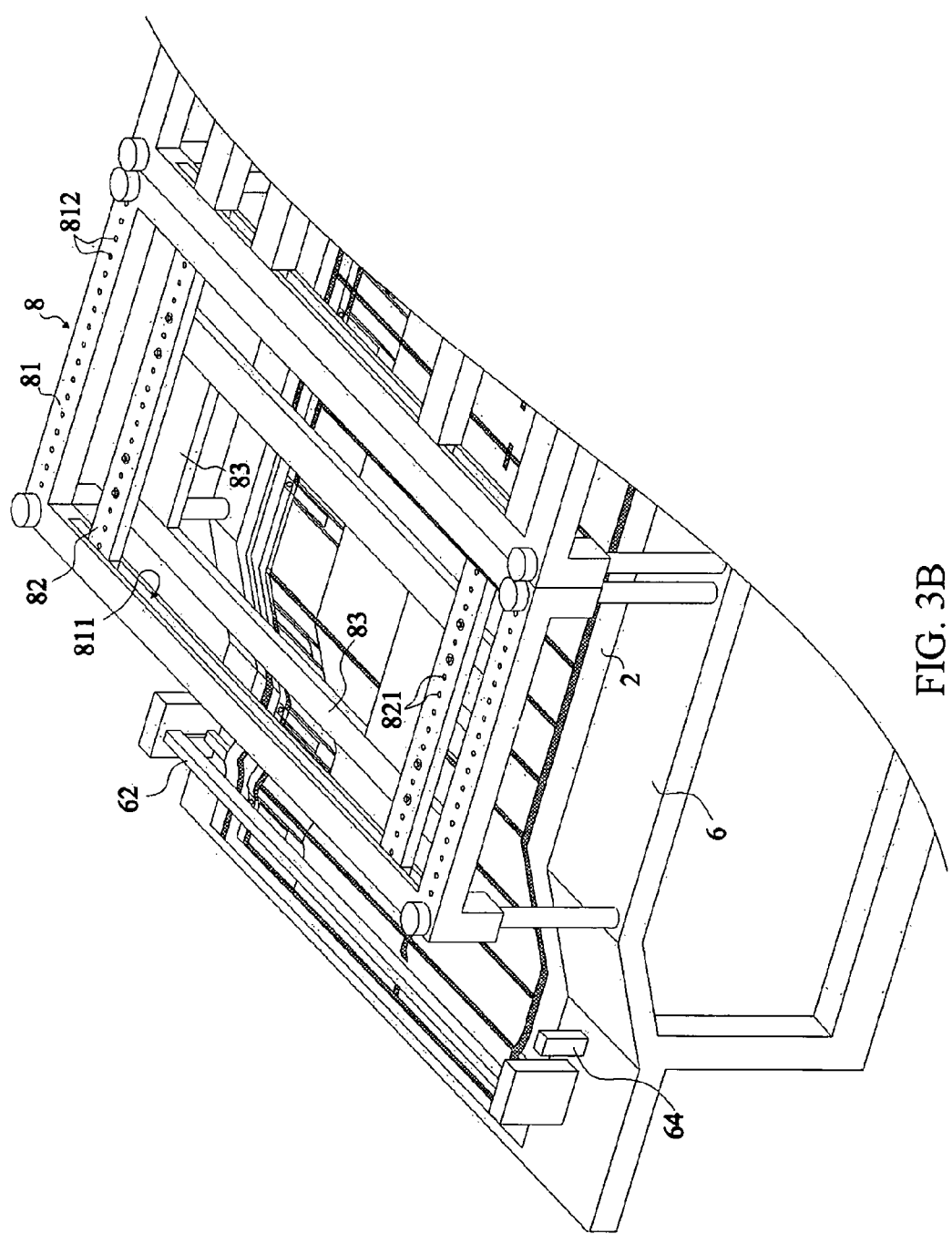
FIG. 3B is a partly perspective view, showing a second hanging frame of the first embodiment according to the present invention.
Figure 4A:
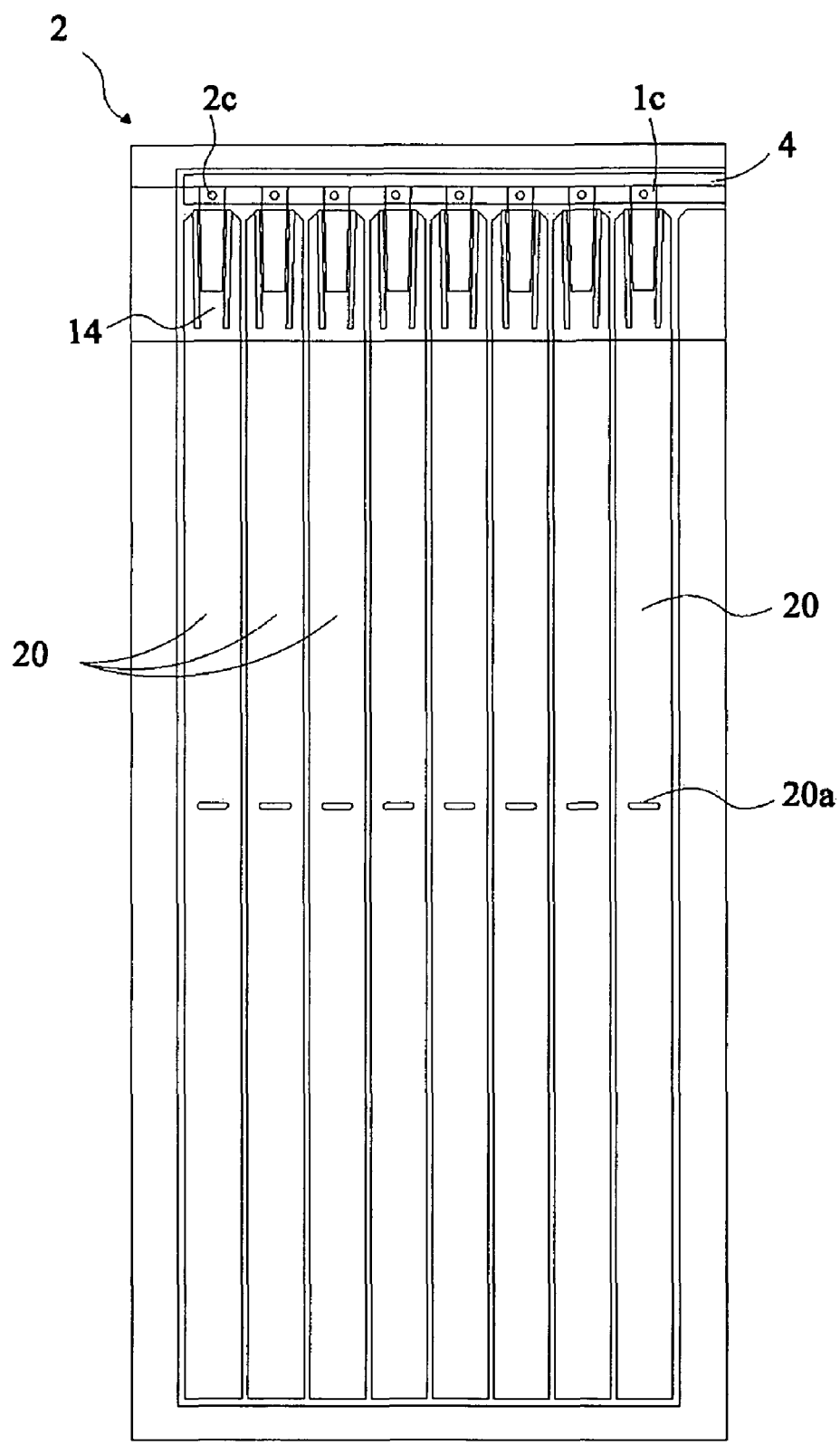
FIG. 4A is a plane view, showing an air cylinder film sheet of the first embodiment according to the present invention after being hot-sealed.
Figure 4B:
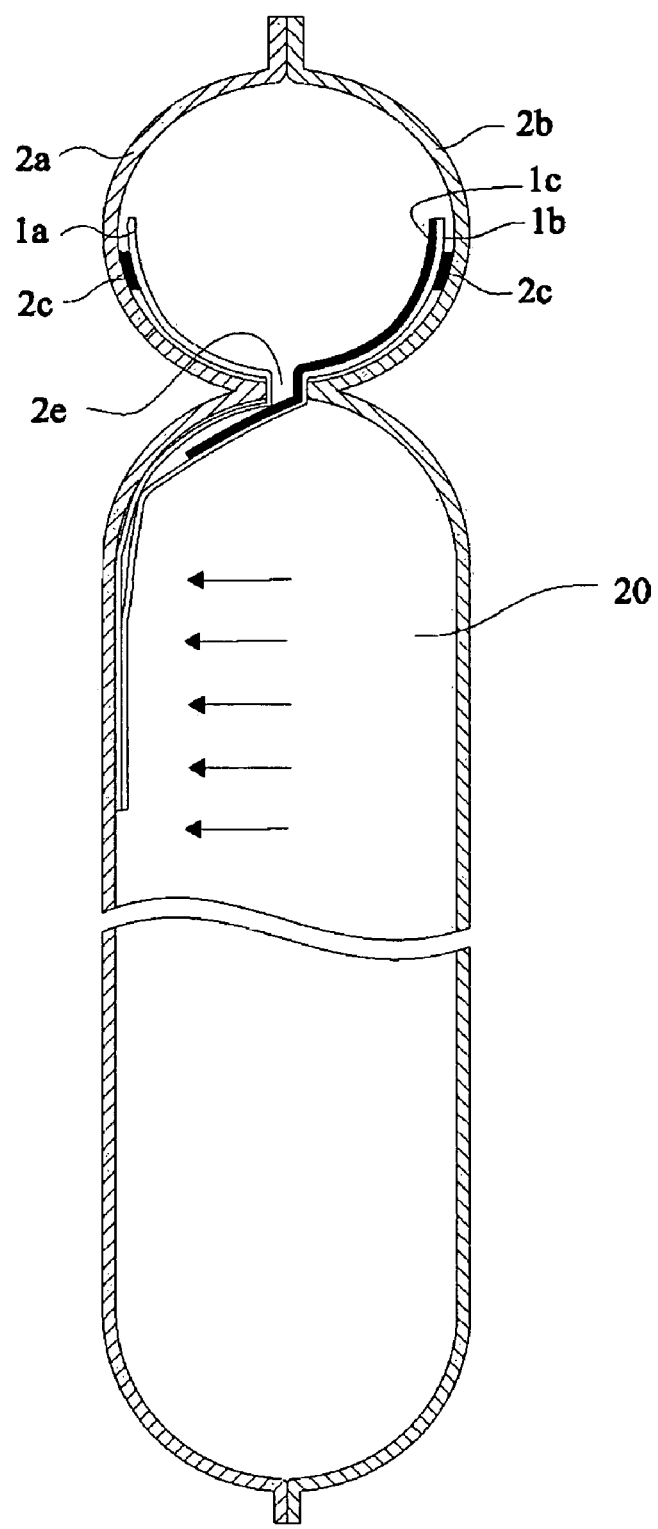
FIG. 4B is a cross sectional view, showing an air cylinder film sheet of the first embodiment according to the present invention after being hot-sealed and filled with air.

Please refer to FIGS. 2, 3A, 3B, 4A and 4B. FIG. 2 is a perspective view, showing a hanging manufacturing apparatus for manufacturing an air enclosure of a first preferred embodiment according to the present invention. FIG. 3A is a partly perspective view, showing a first hanging frame of the first embodiment according to the present invention. FIG. 3B is a partly perspective view, showing a second hanging frame of the first embodiment according to the present invention. FIG. 4A is a plane view, showing an air cylinder film sheet of the first embodiment according to the present invention after being hot-sealed. FIG. 4B is a cross sectional view, showing an air cylinder film sheet of the first embodiment according to the present invention after being hot-sealed and filled with air.

A hanging manufacturing apparatus for manufacturing an air enclosure includes a working platform 6, a first hanger 7 and a second hanger 8.

The working platform 6 is used for mounting an air cylinder film sheet 2 to carry out a hot sealing process to the air cylinder film sheet 2. The working platform 6 includes a plurality of conveying rollers 61 used for conveying the air cylinder film sheet 2, in which the air cylinder film sheet 2 is constituted by two sheets of inner film 1a and 1b stacked between two sheets of outer film 2a and 2b, and the two sheets of inner film 1a and 1b are positioned at slightly lower places from a top of an inside of the two sheets of outer film 2a and 2b. Besides, a heat resistant material 1c is spread between the two sheets of inner film 1a and 1b so as to use the heat resistant material 1c as an air passable passageway, and the two sheets of inner film 1a and 1b may be hot-sealed in advance to form an air passageway 14.

The first hanger 7 is disposed on the working platform 6, and disposed with a first hanging frame 71 and a plurality of first supporting arms 72, the plurality of first supporting arms 72 are installed on the first hanging frame 71 and used for hanging a first hot sealing mold 73, in which a disposition direction of the plurality of first supporting arms 72 is the same as a conveying direction of the air cylinder film sheet 2, and the plurality of first supporting arms 72 will be driven to move when the first hanging frame 71 is moved up and down and to and fro.

The first hanger 7 mentioned above may further be disposed with at least one first guide groove 711 positioned on the first hanging frame 71, two ends of the each first supporting arm 72 may be let in the first slide groove 711 and positioned on the first hanging frame 71. Besides, the plurality of first supporting arms 72 can be moved in the first slide groove 711 so as to adjust a distance between the plurality of first supporting arms 72 to hang a different first hot sealing mold 73.

Furthermore, a plurality of first positioning holes 721 used for hanging the first hot sealing mold 73 are disposed on the first supporting arm 72, in which the first hot sealing mold 73 may be hung on a lower side of the first supporting arm 72 and may also be hung between the plurality of first supporting arms 72.

The second hanger 8 is positioned on the working platform 6, and disposed with a second hanging frame 81 and a plurality of second supporting arms 82, the plurality of second supporting arms 82 used for hanging a second hot sealing mold 83 are installed on the second hanging frame 81, in which a disposition direction of the plurality of second supporting arms 82 is perpendicular to a conveying direction of the air cylinder film sheet 2, and the plurality of second supporting arms 82 will be driven to move when the second hanging frame 81 is moved up and down and to and fro.

The second hanger 8 mentioned above may further be disposed with at least one second slide groove 811 positioned on the second hanging frame 81, two ends of the each second supporting arm 82 may be let in the second slide groove 811 and positioned on the second hanging frame 81. Besides, the plurality of second supporting arms 82 can be moved in the second slide groove 811 so as to adjust a distance between the plurality of second supporting arms 82 to hang a different second hot sealing mold 83.

Furthermore, a plurality of second positioning holes 821 used for hanging the second hot sealing mold 83 are disposed on the second supporting arm 82, in which the second hot sealing mold 83 may be hung on a lower side of the second supporting arm 82 and may also be hung between the plurality of second supporting arms 82.

A hanging manufacturing apparatus for manufacturing an air enclosure disclosed by the present invention further includes a furling unit 5 and a cutting unit 62, in which the furling unit 5 is disposed on one side of the working platform 6 and used for furling the air cylinder film sheet 2, and the cutting unit 62 is disposed on another side of the wording platform 6 opposite to the furling unit 5, and used for cutting the air cylinder film sheet 2 to allow the process completing air cylinder film sheet 2 can be used independently.

In addition, a hanging manufacturing apparatus for manufacturing an air enclosure further includes a displacement adjuster 64 positioned on the working platform 6 and used for adjusting a displacement amount of the air cylinder film sheet 2 conveyed by the conveying rollers 61 so as to use the cutting unit 62 to carry out the cutting when the air cylinder film sheet 2 is moved to a preset displacement amount.

The first hanger 7 mentioned above may further be disposed with a first hanging holes 712 positioned on the first hanging frame 71 to allow the first hot sealing mold 73 to be hung between the first hanging frame 71 and the first supporting arm 72, and The second hanger 8 may further be disposed with a plurality of second hanging holes 813 positioned on the second hanging frame 81 to allow the second hot sealing mold 83 to be hung between the second hanging frame 81 and the second supporting arm 82.

When the air cylinder film sheet 2 is started to carry out the hot sealing process, the first supporting arm 72 and the second supporting arm 82 are first respectively adjusted to proper positions to hang the first hot sealing mold 73 and the second hot sealing mold 83. Thereafter, the conveying rollers are used to convey the air cylinder film sheet 2, the first hanging frame 71 is driven to move downward and the first hot sealing mold 73 hung on the plurality of first supporting arms 72 is driven to move downward so as to allow each first hot sealing mold 73 to hot-seal the two sheets of outer film 2a and 2b of the air cylinder film sheet 2 simultaneously to form a plurality of nodes 20a on the air cylinder film sheet 2. Besides, the first hot sealing mold 73 may also hot-seal the two sheets of outer film 2a and 2b and the two sheets of inner film 1a and 1b of the air cylinder film sheet 2 to form an air filling passageway 4 on the air cylinder film sheet 2 and in the meantime, a part between the two sheets of inner film 1a and 1b spread with a heat resistant material 1c is formed into an air inlet 2e.

And then, the conveying rollers 61 are used to convey the air cylinder film sheet 2, the second hanging frame 81 is driven to move downward, and the second hot sealing mold 83 hung on the plurality of second supporting arms 82 is driven to move downward so as to allow each second hot sealing mold 83 to hot-seal the two sheets of outer film 2a and 2b and the two sheets of inner film 1a and 1b of the air cylinder film sheet 2 simultaneously to form a plurality of air cylinders 20 on the air cylinder film sheet 2.

The hot-sealed air cylinder film sheet 2 is cut into air enclosures through the cutting unit 62 to allow them to be used independently. A user may fill the air filling passageway 4 with air to cause the two sheets of outer film 2a and 2b to be pull apart outward and in the meantime, drive the two sheets of inner film 1a and 1b to pull apart outward through the hot sealing points 2c so as to open each air inlet 2e connected with the air filling passageway 4 to allow air in the air filling passageway 4 to be into the air cylinders 20 through the air passageway 14 to cause them to be filled with air and expanded. Thereby, the air enclosure can be used for packing an article immediately to provide the cushioning protection.

According to the present invention, although the contents listed in the description mentioned above takes using the first hanger 7 to hot-seal the air cylinder film sheet 2 to form the structures such as the air filling passageway 4 and the air inlets 2e as an example to describe, it is not used to limit the present invention; the second hanger 8 may also be used to hot-seal the air cylinder film sheet 2. Besides, the flow mentioned above is also not used to limit that the first hanger 7 must first be used to hot-seal the air cylinder film sheet 2 and the second hanger 8 is then used to hot-seal the air cylinder sheet 2; the hot sealing sequence of the first hanger 7 and the second hanger 8 may also be exchanged.

Figure 5:
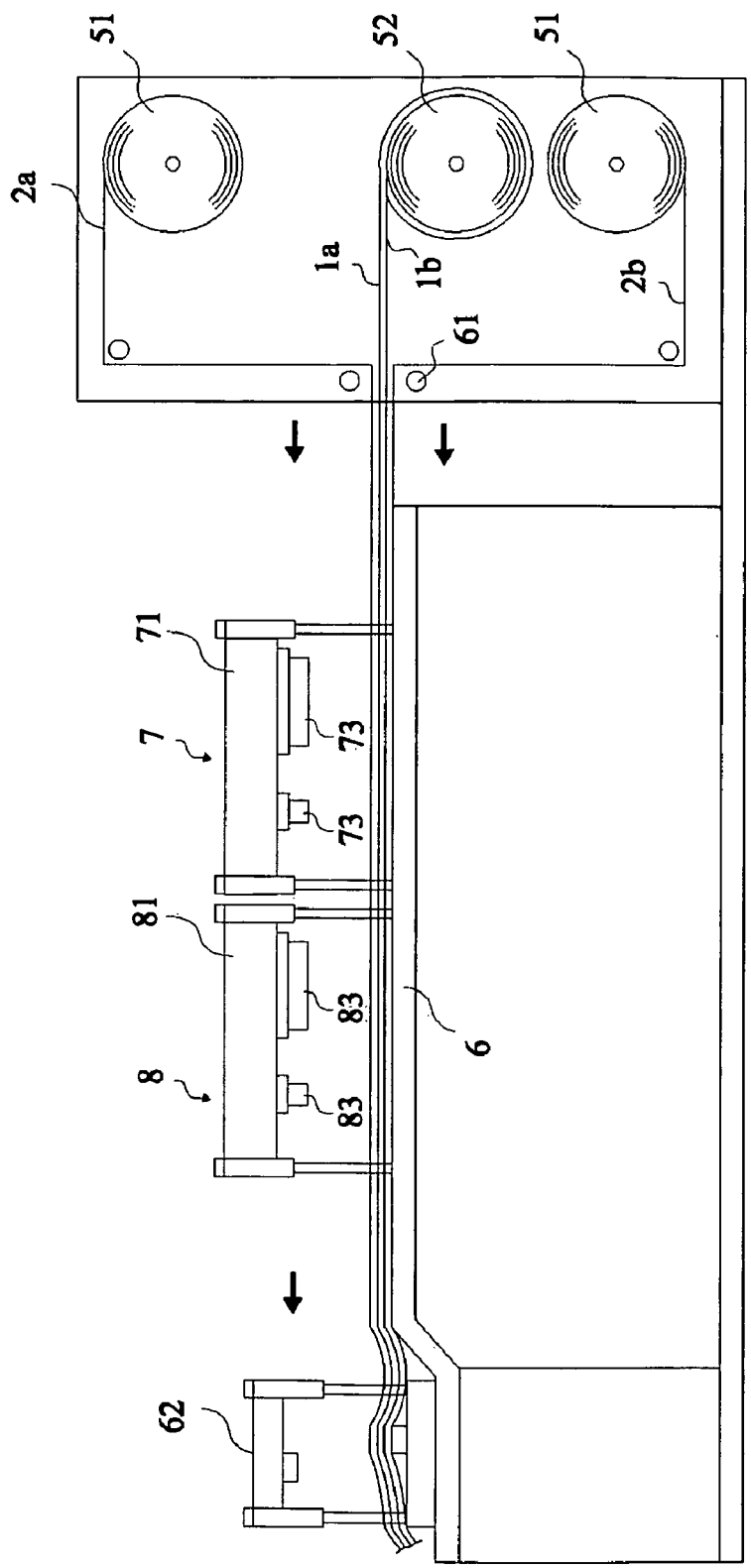
FIG. 5 is a schematic view, showing a hanging manufacturing apparatus for manufacturing an air enclosure of a second preferred embodiment according to the present invention.

Please refer to FIG. 5. FIG. 5 is a schematic view, showing a hanging manufacturing apparatus for manufacturing an air enclosure of a second preferred embodiment according to the present invention.

In this embodiment, the furling unit 5 is constituted by two outer film furling rollers and at least one inner film furling roller 52, in which the outer film furling roller 51 is used for rolling up two sheets of outer film 2a and 2b and the inner film furling roller 52 is used for rolling up two sheets of inner film 1a and 1b.

Figure 6:
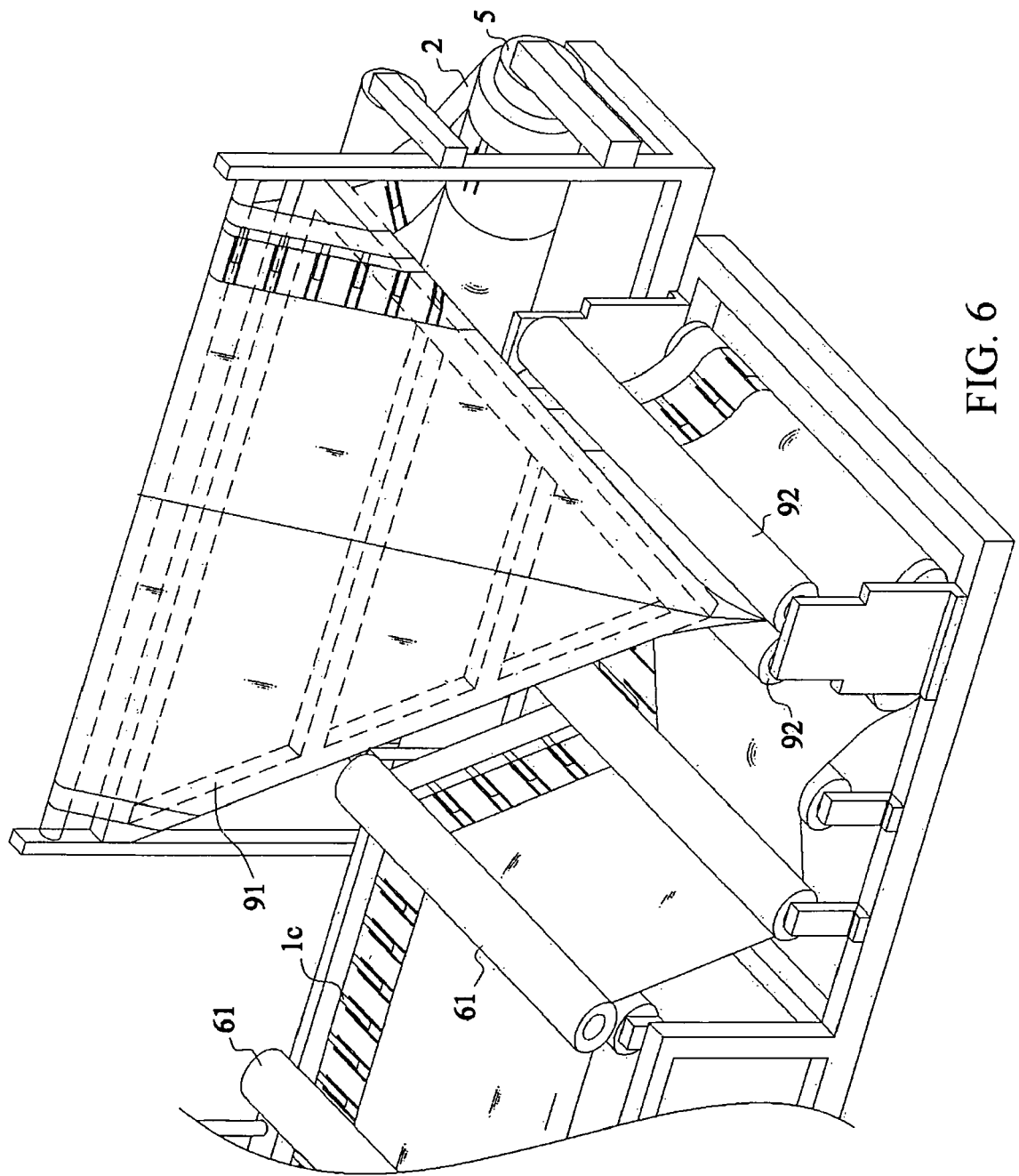
FIG. 6 is a perspective view, showing a hanging manufacturing apparatus for manufacturing an air enclosure of a third preferred embodiment according to the present invention.

Please refer to FIG. 6. FIG. 6 is a perspective view, showing a hanging manufacturing apparatus for manufacturing an air enclosure of a third preferred embodiment according to the present invention.

A hanging manufacturing apparatus for manufacturing an air enclosure according to the present invention further includes a folding unit 91 and a plurality of folding roller 92 positioned on one side of the wording platform 6, in which one side of the folding unit 91 close to the plurality of folding rollers 92 is gradually contracted to form a sharp-angled or C-typed body. The folding unit 91 guides the air cylinder film sheet 2 around the furling unit 5 to enter a place between the folding rollers 92 so as to fold the air cylinder film sheet 2 up to allow a bag to be formed after the hot sealing of the first hanger 7 and the second hanger 8.

According to the present invention, the first hanging frame 71 is used to drive the first hot sealing mold 73 to hot-seal the air cylinder film sheet 2 and the second hanging frame 82 is used to drive the second hot sealing mold 83 to hot-seal the air cylinder film sheet 2 thereby simplifying the flow of the hot sealing process of the air cylinder sheet 2 to enable the flow to be more compact and smooth, and further elevating the efficiency of the entire hot sealing process flow. In addition, a distance between the first supporting arms 72 and a distance between the second supporting arms 82 according to the present invention can be adjusted so that a different first hot sealing mold 73 and a different second hot sealing mold 83 can be hung depending on the different distance, a user is easy to hang or make a replacement of a first hot sealing mold 73 and a second hot sealing mold 83, and a displacement amount of the air cylinder film sheet 2 is adjusted through the displacement adjuster 64 thereby carrying out a process to the air cylinder film sheet with a different size to enable a processed air enclosure to be more diversified.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A hanging manufacturing apparatus for manufacturing an air enclosure, comprising:

a working platform, comprising a plurality of conveying rollers used for conveying an air cylinder film sheet;

a first hanger, disposed on the working platform and comprising a first hanging frame and a plurality of first supporting arms, the plurality of first supporting arms being movably installed on the first hanging frame and used for hanging at least one first hot sealing mold, a disposition direction of the plurality of first supporting arms being the same as a conveying direction of the air cylinder film sheet, the first hanging frame driving the first hot sealing mold on the plurality of first supporting arms to hot-seal the air cylinder film sheet while being moved; and a second hanger, disposed on the working platform and comprising a second hanging frame and a plurality of second supporting arms, the plurality of second supporting arms being movably installed on the second hanging frame and used for hanging at least one second hot sealing mold, a disposition direction of the plurality of second supporting arms being perpendicular to a conveying direction of the air cylinder film sheet, the second hanging frame driving the second hot sealing mold on the plurality of second supporting arms to hot-seal the air cylinder film sheet while being moved, wherein:

the first hanger further comprises at least one slide groove disposed on the first hanging frame, two ends of the plurality of first supporting arms are positioned on the first slide groove and movable in the first slide groove, such that the first supporting arms are movable above the air cylinder film sheet in a horizontal direction while maintaining a constant distance from a top surface of the air cylinder film sheet;

the first supporting arm comprises a plurality of first positioning holes used for hanging the first hot sealing mold;

the first hanger further comprises a plurality of hanging holes positioned on the first hanging frame to allow the first hot sealing mold to be hung between the first hanging frame and the first supporting arm;

the second hanger further comprises at least one slide groove disposed on the second hanging frame, two ends of the plurality of second supporting arms are positioned on the second slide groove and movable in the second slide groove, such that the second supporting arms are movable above the air cylinder film sheet in a horizontal direction while maintaining a constant distance from a top surface of the air cylinder film sheet;

the second supporting arm comprises a plurality of second positioning holes used for hanging the second hot sealing mold;

the second hanger further comprises a plurality of hanging holes positioned on the second hanging frame to allow the second hot sealing mold to be hung between the second hanging frame and the second supporting arm; and a displacement adjuster is disposed on the working platform and used for adjusting a displacement amount of the air cylinder film sheet.

2. The hanging manufacturing apparatus for manufacturing an air enclosure according to claim 1, wherein the air cylinder film sheet comprises two outer films and at least one inner film, the inner film is placed between the two outer films.

3. The hanging manufacturing apparatus for manufacturing an air enclosure according to claim 2, further comprising a furling unit disposed on one side of the working platform and used for rolling up the air cylinder film sheet.

4. The hanging manufacturing apparatus for manufacturing an air enclosure according to claim 3, wherein the furling unit comprises two outer film furling wheels and at least one inner film furling wheel, the outer film furling wheel is used for rolling up the outer film and the inner film furling wheel is used for rolling up the inner film.

5. The hanging manufacturing apparatus for manufacturing an air enclosure according to claim 1, wherein the first hot sealing mold is hung on an lower side of the first supporting arm.

6. The hanging manufacturing apparatus for manufacturing an air enclosure according to claim 1, wherein the first hot sealing mold is hung between the plurality of first supporting arms.

7. The hanging manufacturing apparatus for manufacturing an air enclosure according to claim 1, wherein the first hot sealing mold hot-seals the air cylinder film sheet to form an air filling passageway.

8. The hanging manufacturing apparatus for manufacturing an air enclosure according to claim 1, wherein the second hot sealing mold is hung on an lower side of the second supporting arm.

9. The hanging manufacturing apparatus for manufacturing an air enclosure according to claim 1, wherein the second hot sealing mold is hung between the plurality of second supporting arms.

10. The hanging manufacturing apparatus for manufacturing an air enclosure according to claim 1, further comprising a folding unit and a plurality of folding rollers disposed on one side of the working platform, the folding unit guides the air cylinder film sheet to enter between the plurality of folding rollers to cause the air cylinder film sheet to be folded up.

11. The hanging manufacturing apparatus for manufacturing an air enclosure according to claim 10, wherein one side of the folding unit close to the plurality of the plurality of folding roller is gradually contracted.

12. The hanging manufacturing apparatus for manufacturing an air enclosure according to claim 1, further comprising a cutting unit disposed on the working platform and used for cutting the air cylinder film sheet.

13. The hanging manufacturing apparatus for manufacturing an air enclosure according to claim 1, wherein the first hot sealing mold hot-seals the air cylinder film sheet to form a plurality of nodes, the second hot sealing mold hot-seals the air cylinder film sheet to form a plurality of air cylinders.

* * * * *